(12) United States Patent
Donndelinger et al.

(10) Patent No.: US 10,678,834 B2
(45) Date of Patent: Jun. 9, 2020

(54) METHODOLOGY FOR GENERATING A CONSISTENT SEMANTIC MODEL BY FILTERING AND FUSING MULTI-SOURCE ONTOLOGIES

(71) Applicant: GM Global Technology Operations LLC, Detroit, MI (US)

(72) Inventors: Joseph A. Donndelinger, Woodway, TX (US); Susan H. Owen, Bloomfield, MI (US); Dnyanesh G. Rajpathak, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 509 days.

(21) Appl. No.: 15/422,540

(22) Filed: Feb. 2, 2017

(65) Prior Publication Data

US 2018/0218071 A1 Aug. 2, 2018

(51) Int. Cl.
*G06F 16/36* (2019.01)
*G06N 20/00* (2019.01)
*G06N 5/02* (2006.01)
*G06N 7/00* (2006.01)

(52) U.S. Cl.
CPC .......... *G06F 16/367* (2019.01); *G06N 5/022* (2013.01); *G06N 7/005* (2013.01); *G06N 20/00* (2019.01)

(58) Field of Classification Search
CPC ...... G06F 16/367; G06N 5/022; G06N 7/005; G06N 20/00
See application file for complete search history.

(56) References Cited

U.S. PATENT DOCUMENTS

2012/0233112 A1* 9/2012 Rajpathak ........... G06F 17/2785
706/54
2017/0185674 A1* 6/2017 Tonkin ................. G06F 16/328

OTHER PUBLICATIONS

Gupta, An Instance Based Methodology for Merging Domain Ontology, pp. 848-855 (Year: 2009).*
Cho, A New Method for Ontology Merging based on Concept using WordNet, pp. 1573-1576 (Year: 2006).*
Rajpathak, An Ontology-Based Text Mining Method to Develop D-Matrix from Unstructured Text, IEEE Transactions on Systems, Man, and Cybernetics: Systems, vol. 44, No. 7, pp. 966-977, Jul. (Year: 2014).*

* cited by examiner

*Primary Examiner* — Albert M Phillips, III
(74) *Attorney, Agent, or Firm* — Reising Ethington P.C.

(57) ABSTRACT

A system, for filtering and fusing multi-source ontologies. The system includes a tangible processing controller unit and non-transitory computer-readable storage device in communication with the tangible processing controller unit. The storage device includes a first receiving unit that, when executed by the tangible processing control unit, receives a plurality of ontologies, each ontology having a set of rules and a class structure with a plurality of data classes. The storage device also includes a second receiving unit that, when executed, receives data. The device also includes a comparison unit that compares the data classes from the plurality of ontologies, and a merging unit that merges the data classes that are identical or consistent into a new data class. The storage device also includes a discarding unit that discards the data classes that are inconsistent. The storage device also includes a new-set-generation unit that generates a new set of class structure.

20 Claims, 5 Drawing Sheets

METHODOLOGY FOR GENERATING A CONSISTENT SEMANTIC MODEL BY FILTERING AND FUSING MULTI-SOURCE ONTOLOGIES

TECHNICAL FIELD

The present disclosure relates generally to data mining and ontology learning of service repair data from multiple sources.

BACKGROUND

This section provides background information related to the present disclosure which is not necessarily prior art.

Original equipment manufacturers (OEMs) rely on service repair data to learn about the effect of their design and possible ways to improve their internal design and manufacturing processes. Manufacturers of vehicle also rely on data originating from several other sources such as faults reported on government sites, e.g., National Highway Traffic Safety Administration (NHTSA), and call centers, e.g., Customer Assistance Center (CAC) and Technician Assistance Center (TAC), among others. Because the data is generally unstructured and, being from different sources, in various formats or arrangements, it is very difficult to make good use of these data.

SUMMARY

The present application is directed to a system and method that makes service repair data from different sources available for further actions.

The technology merges multiple ontologies according to a pre-determined set of rules and generates a new ontology that can be applied to a new set of data.

In one embodiment, the present technology is system including a tangible processing control unit and a non-transitory computer-readable storage device having a set of computer-readable codes, which when executed by the control unit in a computer, causes the computer to receive a plurality of ontologies, each ontology having a set of rules and a class structure with a plurality of data classes, to receive a plurality of data, to compare the data classes from the plurality of ontologies, to merge the data classes that are the same or consistent into a new data class, to discard the data classes that are inconsistent, and to generate a new set of class structure.

In another embodiment, the present technology is a process for filtering and fusing multi-source ontologies. The process includes receiving a plurality of ontologies, each ontology having a set of rules and a class structure with a plurality of data classes, receiving a plurality of data, comparing the data classes from the plurality of ontologies, merging the data classes that are the same or consistent into a new data class, discarding the data classes that are inconsistent, and generating a new set of class structure.

Other aspects of the present technology will be in part apparent and in part pointed out hereinafter.

The features and advantages of the present invention will become better understood from a careful reading of a detailed description provided herein below with appropriate reference to the accompanying drawings.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

In essence, the present technology enables a manufacturer to learn about the effect of their design and the quality of their manufacturing process by analyzing data collected from the users of their products and also from third parties, such as governmental agencies, who have the opportunity to observe the impact of the products or who receive complaints about the products.

The present technology enables merging the data from the difference sources with existing ontology data bases and forming a new ontology database, so the collected information can be easily interpreted and used otherwise.

For automotive manufacturers, generally the data may come from external sources (e.g., Vehicle Owners Questionnaire, NHTSA, etc.) as well from internal sources (e.g., warranty records, technician assistance center data, customer assistance center data, etc.). Typically data from these data sources consist of unstructured text, or verbatim data. The complaint or the repair verbatim describes the problems faced by the vehicle owners. The complaint or the repair verbatim consists of information about a faulty part/system/subsystem/module, symptoms observed in a fault situation, failure modes identified as causing the parts to fail, and/or repair actions performed to fix the problem. The external data (from, e.g., Vehicle Owners Questionnaire, NHTSA) along with any of the other information mentioned, may also includes data indicating accident events, how a vehicle body was impacted, if at all, and vehicle body anatomy that was affected in accident event.

Unstructured text data—e.g., verbatim data—are typically records created from feedback provided by different customers, different technicians at dealerships, or different subject matter experts, at a technician assistance center, for instance. Because there are typically not pat responses or standardized vocabulary used to describe the problem, several verbatim variations are observed for mentioning the same problem. An auto maker must extract the necessary fault signal out of all such data points to perform safety or warranty analysis, so the design of the system can be improved to save future vehicle fleet from facing the same problem.

Text mining algorithms are commonly used to extract fault information from the unstructured text data. The text mining algorithms apply the ontologies to first identify the critical terms such as faulty parts/systems/subsystems/modules, the symptoms observed in a fault situation, the failure modes, the repair actions, accident events, body impact, and body anatomy mentioned in the unstructured text data. One of these text mining methods is described in the U.S. Patent Application Publication 2012/0011073, which is incorporated here in its entirety by this reference.

The ontologies associated with different data sources are extracted, but because there are variations in the way the terms are mentioned in different data from various sources, as well as not all data sources necessarily mentioning all critical terms to describe the situation, it is important to process the extracted ontologies. Extracted multi-term phrases from different data sources are mapped to the existing class structure that precisely captures the types of information recorded in a specific data source. In one embodiment, the existing class structure includes any one or more of the following classes: S1 (defective part), SY (Symptom), FM (failure mode), A (Action taken), AE (Accident Event), BI (Body Impact), and BA (Body Anatomy).

These classes are also used by different organizations to organize the instances of these classes when extracted from the data. Each organization may form different class structures based on the data that the organization is analyzing to derive business insight and, because each of the organizations has different focuses, the corresponding classes in various embodiments reflect the focus or focuses of each respective organization.

For each manufacturer, the appropriate class structures for the data in hand are identified as per different organizations' requirements, and the class structures are modified accordingly. For example, a service-and-quality organization may be interested in identifying the faulty parts/systems/subsystems/modules, the symptoms observed in a fault situation, their associated failure modes, and the repair actions, while a safety organization may be interested in faulty parts/systems/subsystems/modules, the symptoms observed in a fault situation, along with accident events, body impact if any, and the body anatomy affected in the accident event. The service-and-quality organization can apply the processes of the present technology on the data to enable the class instances to be automatically mapped to the appropriate classes relevant to the organization. However, when the safety organization applies the proposed processes to analyze the safety-organization data, such as NHTSA VOQ data. Then the classes, such as failure modes and actions, which are relevant for the service-and-quality organization, can be omitted, and new classes such as accident events, body impact, and body anatomy are automatically learned from the data. The new classes are learned from the data as the new information becomes available and when the existing class structure provide limited mapping to organize the information in the data.

As mentioned earlier, the data comes from different sources and different stakeholders provide information associated with the faulty parts, their symptoms, the failure modes, etc. In various embodiments it is important that the information extracted and organized from these different data sources into an ontology is mapped consistently with pre-existing internal data to provide better understanding of where the problem resides in the vehicle system, sub system, modules, etc.

To this end, when the classes and their instances are extracted from the data, and they are organized as per the class structures relevant to the data, the processes of the present technology provides a mapping mechanism that allows the information, extracted from the data, to be mapped to a pre-existing internal metadata such as Vehicle Partitioning and Product Structure (VPPS). This mapping helps engineers or other personnel working on specific systems, subsystems, or modules in different divisions to realize the correspondence of fault or failure mentioned to the external data or at least to its relation to the vehicle architecture. This relationship also helps the engineers to perform analysis of other systems that can be affected due to the fault or the failure identified in the data, to get a holistic view of fault propagation.

The process of the present technology is dynamic in various embodiments, not static, as it can be applied iteratively as new data becomes available. However, the frequency of applying the process depends on business requirements. For instance, the service-and-quality organization may apply this process on a daily basis to get an insight into daily customer incidences, while a manufacturing division may apply it once a week to see the faults or the failures observed during each batch of production run, etc.

While select examples of the present technology describe applications in the automobile industry, the technology is not limited by the focus. The concepts can be extended to a wide variety of industries, such as service industry, construction industry, aerospace industry, marine-craft industry, manufacturing industry, and all such industries where fault-related unstructured text or verbatim data is collected.

The present technology introduces processes for a creating consistent ontology and automatic mapping of the classes of newly created ontology with the existing classes and their internal structure. The ontology describes the rules for processing raw data collected from different sources and also the rules for associating the processed collected data with data classes. The raw data may be collected from vehicle owners, repair technicians, police officers, call centers, etc., and the raw data may include verbatim statements from these different sources.

The ontology is applied to the raw data according to the rules in the ontology. As an example of such rules is listed in table 1.

TABLE 1

| IF | THEN |
|---|---|
| A Baseword includes a phantom space | Remove the phantom space |
| A Term includes punctuation | Remove punctuation |
| A Term includes the phrase "customer states" | Remove the phrase "customer states" |
| A Baseword is misspelled | Correct spelling |
| A Term is misspelled | Retain the misspelled instance |
|  | Supplement ontology with correctly spelled Term |
| A Symptom Term is a verb | Use the infinitive of the verb as the Baseword |
| A Symptom Term is a noun form of a verb | Use the infinitive of the verb as the Baseword |
| A Symptom Term is a negative form of a verb | Use infinitive of verb preceded by "will not" as the Baseword |

TABLE 1-continued

| IF | THEN |
|---|---|
| A Symptom Term includes a verb modified by an adverb | Leave Term intact as a single Symptom |
| A Symptom Term includes a Part Name | Separate Terms<br>Assign Symptom to SY<br>Assign Part Name to S1 |
| A Symptom Term includes multiple Symptoms exhibited by the same Part | Leave Term intact as a single Symptom |
| A Symptom Term includes multiple Symptoms, but each Symptom is exhibited by a unique Part | Separate Part Name and Symptom Terms<br>Assign each Part Name Term to S1<br>Assign each Symptom Term to SY |
| The part of speech is ambiguous; i.e. the Term could be assigned as either a Part Name or a Symptom | Assign Term to SY |
| The same Term is assigned to multiple Basewords | Identify and retain the most appropriate Term-to-Baseword assignment.<br>Remove all others. |
| The ontology contains synonymous Basewords | Choose the most appropriate Baseword<br>Aggregate Terms from the synonymous Basewords |

When a raw data comprising "Customer states engine would not crank. Found dead battery. Replace battery" during the processing according to the ontology of table 1, "customer states" is removed and special characters, e. g question marks, punctuations, hyphenations, exclamations, unnecessary white space, etc. are also removed. Also, the non-descriptive stop words (for example 'a', 'an', 'the', 'who') are deleted from the verbatim to reduce the noise as they do not add any value to the analysis. The resulting data is processed and associated with different classes.

For example, the phrase "Body Control Module" is identified as the faulty part and it is associated with class S1, the phrase "would not crank" is identified as a symptom and therefore it is associated with class SY, the phrase "Dead battery" would be assigned to class failure mode (FM), and "replace battery" would be assigned to data class Action (A). As mentioned earlier, the repair verbatim is collected from different sources and therefore a part, or symptom, or failure mode or action may be recorded by using inconsistent vocabulary, a correct baseword is assigned to all such variations to normalize the variations. For example, the faulty part in one instance is described as "BCM" while in other instance it is described as "Body Control Module", the consistent baseword, for example, "Body Control Module" is automatically assigned to both the variations to keep the internal data captured by the ontology consistent.

Because the raw data may be from difference sources, a similar problem may be described differently. A description of "Customer states engine would not crank. Found dead battery. Replace battery," for instance, may be expressed differently, such as, "customer said engine does not start; battery bad and replaced." After applying the same ontology, "engine does not start" may be associated consistently with the symptom, which is class SY, and "battery bad" may be consistently associated with the incident as the failure mode, which is class FM, even though the such phrases are coming from different verbatim. The application of the same ontology allows the class structures to be identical. In other instances, the phase "internal short" in some verbatim may be referred to as the symptom while in some other verbatim it is referred to as the failure mode.

The determination on when a phase is interpreted as one class (e.g., symptom) or another class (e.g., failure mode) can be done through a probability model. The internal probability model estimates the likelihood of a phrase, say "internal short," being reported as a symptom versus it being reported as a failure mode in the context of the data. That is $P(\text{Internal Short}_{SY}|\text{Co-Occurring Term}_i)$ and $P(\text{Internal Short}_{FM}|\text{Co-Occurring Term}_i)$, where Co-Occurring Term$_i$ represent the terms, which are co-occurring with the phrase "Internal Short" in verbatim and based on a higher probability value that such phrase is assigned either to the class SY or to the class FM. The $P(\text{Internal Short}_{SY}|\text{Co-Occurring Term}_i)$ is in various embodiments calculated as follows.

$$P(\text{Internal Short}_{SY} \mid \text{Co-occurring Term}_j) = \qquad (1)$$
$$\operatorname{argmax}_{\text{Internal Short}_{SY}} \frac{P(\text{Co-occurring Term}_j \mid \text{Internal Short}_{SY}) \, P(\text{Internal Short}_{SY})}{P(\text{Co-occurring Term}_j)}$$

Because the same set of terms co-occur with Internal Short$_{SY}$, the denominator from Eq. (1) can be removed, yielding Eq. (2):

$$P(\text{Internal Short}_{SY}|\text{Co-occurring Term}_j) = \operatorname{argmax}_{\text{Internal Short}_{SY}}(P(\text{Co-occurring Term}_j|\text{Internal Short}_{SY})P(\text{Internal Short}_{SY})) \qquad (2)$$

All the co-occurring terms with the phrase "Internal Short" make up our context 'C,' which is used for the probability calculations. And using a suitable assumption, such as the Naïve Bayes assumption, that each term co-occurring with the phrase "Internal Short" is independent, yields Eq. (3)

$$P(C \mid \text{Internal Short}_{SY}) = \qquad (3)$$
$$P = (\{\text{Co-occurring Term}_j \mid \text{Co-occurring Term}_j \text{ in } C\} \mid \text{Internal Short}_{SY}) =$$
$$\prod_{\text{Co-Occurring Term}_j \in C} P(\text{Internal Short}_{SY} \mid \text{Co-occurring Term}_j)$$

The probabilities, $P(\text{Co-occurring Term}_j | \text{Internal Short}_{SY})$ and $P(\text{Internal Short}_{SY})$ in Eq. (2) is calculated by using Eq. (4).

-continued $$P(\text{Co-occurring Term}_j \mid \text{Internal Short}_{SY}) = \frac{f(\text{Co-occurring Term}_j, \text{Internal Short}_{SY})}{f_{\text{Internal Short}_{SY}}} \quad (4)$$

and $$P(\text{Internal Short}_{SY}) = \frac{f(\text{Internal Short}_{SY})}{f(\text{Term}')}$$

On the same lines, now we show how we calculate the $P(\text{Internal Short}_{FM} \mid \text{Co-occurring Term}_j)$ below.

$$P(\text{Internal Short}_{FM} \mid \text{Co-occurring Term}_i) = \quad (5)$$

$$\text{argmax}_{\text{Internal Short}_{FM}} \frac{P(\text{Co-occurring Term}_i \mid \text{Internal Short}_{FM}) P(\text{Internal Short}_{FM})}{P(\text{Co-occurring Term}_i)}$$

Because there are same set of terms co-occur with Internal Short$_{FM}$, the denominator may be removed from Eq. (5), yielding Eq. (6):

$$P(\text{Internal Short}_{FM} \mid \text{Co-occurring Term}_i) = \text{argmax}_{\text{Internal Short}_{FM}}(P(\text{Co-occurring Term}_i \mid \text{Internal Short}_{FM}) P(\text{Internal Short}_{FM})) \quad (6)$$

The co-occurring terms having the phrase "Internal Short" make up the context, 'C', and, using a suitable assumption such as the Naïve Bayes assumption, that each term co-occurring with the phrase "Internal Short" is independent, yields Eq. (7):

$$P(C \mid \text{Internal Short}_{FM}) = P(\{\text{Co-occurring Term}_i \mid \text{Co-occurring Term}_i \text{ in } C\} \mid \text{Internal Short}_{FM}) = \Pi_{\text{Co-Occurring Term}_i \in C} P(\text{Internal Short}_{FM} \mid \text{Co-occurring Term}_i) \quad (7)$$

The probabilities, $P(\text{Co-occurring Term}_i \mid \text{Internal Short}_{FM})$ and $P(\text{Internal Short}_{FM})$ in Eq. (6) is calculated by using Eq. (8).

$$P(\text{Co-occurring Term}_i \mid \text{Internal Short}_{FM}) = \frac{f(\text{Co-occurring Term}_i, \text{Internal Short}_{FM})}{f_{\text{Internal Short}_{FM}}} \quad (8)$$

and $$P(\text{Internal Short}_{FM}) = \frac{f(\text{Internal Short}_{FM})}{f(\text{Term}')}$$

The probabilities $P(\text{Internal Short}_{SY} \mid \text{Co-Occurring Term}_i)$ and $P(\text{Internal Short}_{FM} \mid \text{Co-Occurring Term}_i)$ are compared, and if the probability $P(\text{Internal Short}_{SY} \mid \text{Co-Occurring Term}_i)$ is higher than the probability $P(\text{Internal Short}_{FM} \mid \text{Co-Occurring Term}_i)$, then the phrase 'Internal Short' is assigned to the class SY; else it is assigned to the class FM.

Figure 1:
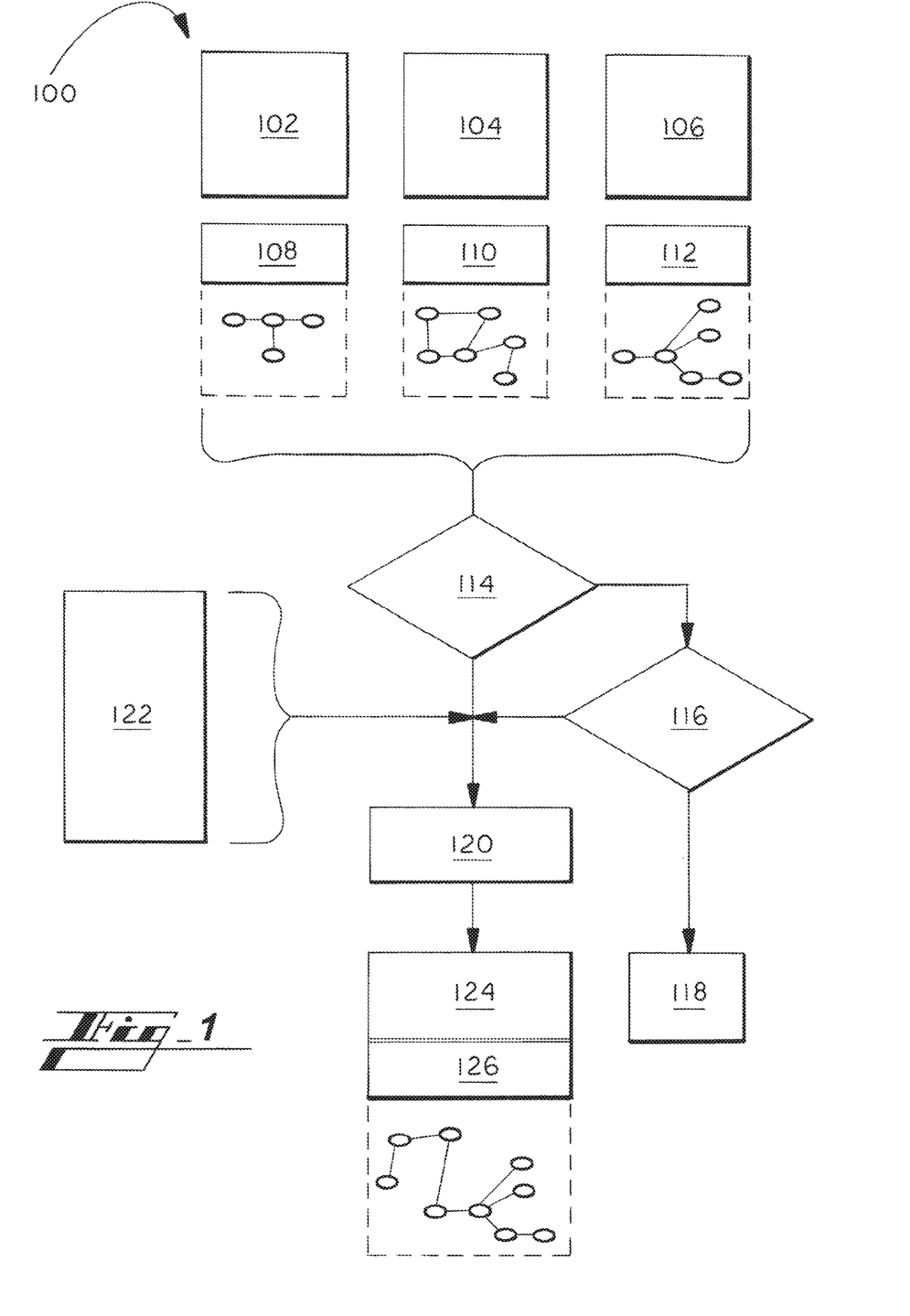
FIG. 1 is architecture 100 for embodiments of the present technology.

FIG. 1 illustrates an architecture 100 for implementing various embodiments of the present technology that merge different ontologies. Different ontologies 102, 104, 106, from different sources—e.g., organizations—and their respective class structures 108, 110, 112 are compared if they are the same, 114. If these ontologies are different from each other, it is checked whether they are consistent with each other, 116. That is, the classes from the different ontologies are compared with each other to see whether they are consistent with each other. Also in various embodiments, instances of classes are compared with each other to make sure that there is no conflict with class affiliations. For example, the instance "does not work" in one ontology may be represented as an instance of the class SY while in other ontology it is represented as an instance of the class FM.

The inconsistent rules as well as inconsistent classes and instances are in some implementations resolved by merging the classes into a single consistent class and their instances are merged accordingly, while the rules and the classes that are not relevant to the application are removed 118 from the resulting ontologies. The consistent rules are merged with identical rules from the different ontologies along with metadata 122 collected from new sources. The new data includes metadata and also new ontologies. The rules from different ontologies are merged, 120, and a new set of the ontology is created, 124, with a new data class structure, 126.

The metadata is used to map the vocabulary used to capture the phrases in external data source to an internal data that has a common understanding across different organizations. For example, if the Service Data consists of the phrase 'engine control module,' whereas the internal metadata has the phrase 'powertrain control module,' which may be understood by a relevant engineering, or manufacturing, group, etc., then the term 'engine control module' referred in the external data is mapped to the internal database automatically. In this way, when a modification to the design requirements is required, the design or engineering teams can know precisely what type of faults/failures were observed and mentioned in the external data, and these fault/failures are associated with which part/component. By learning the failure and the component associate with the failure, the design and engineering team can make necessary changes to overcome the problem and to avoid the similar fault in future.

Figure 2:
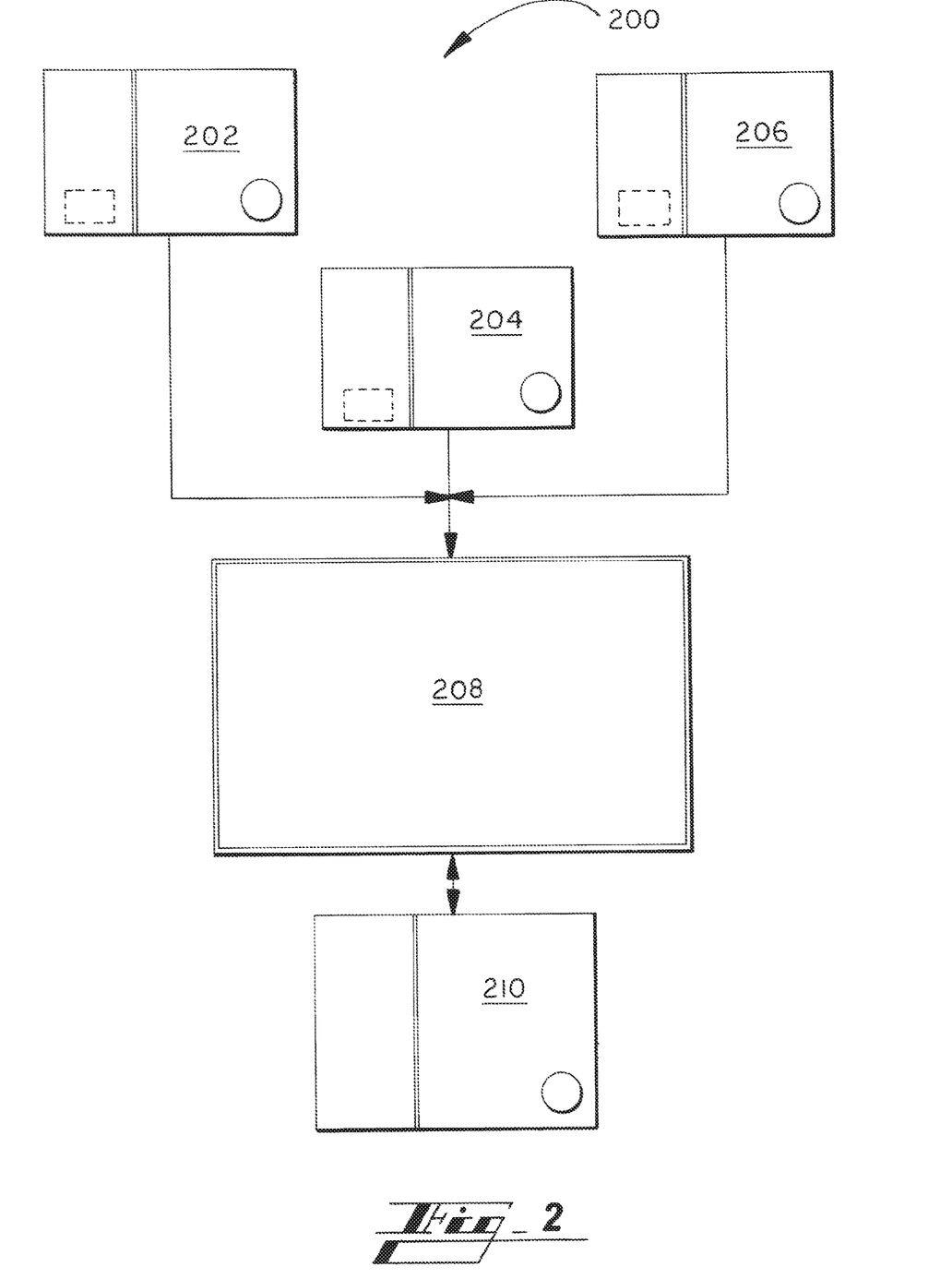
FIG. 2 is a process 200 for merging rules from the heterogeneous ontologies.

FIG. 2 illustrates a process 200 for merging rules from heterogeneous ontologies 202 (service), 204 (quality), 206 (wiring) from different organizations.

Each process or function herein may be performed by a tangible processing control unit, such as unit 910 executing computer-readable code stored at a storage unit, such as unit 920.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage units or modules 110 storing computer-readable code or instructions executable by the processing unit 106 to perform the functions of the controller system 20 described herein. For instance, a module that analyzes data, as described below in connection with FIG. 2, may be referred to as a data-analysis module.

Continuing with FIG. 2, as an example, the ontology 202 may be from a service organization, the ontology 204 may be from a quality-control organization, and the ontology 206 may be from a manufacturing (e.g., wiring) organization. Each ontology has a unique set of rules to determine which classes are relevant to tag the data associated with each organization. For example, for the service organization, the ontology 202 has: a data class S1 for faulty part/component/module source, a data class SY for faulty symptom, data class FM for failure mode, and a data class A for action taken. The data classes for each ontology are determined by analyzing the data, such as using a data-analysis module of the computer-readable code of the storage unit, that is relevant to the organization. For example, the rules are used to identify and to tag the phrases from the data. Once the phrases are identified, they are classified into their most appropriate classes. This classification determines which class instances are observed in the data and only such classes are retained in the ontology. The same process is applied to determine the class structure of the ontology by analyzing the data collected for the different organization. This process is not static in nature but it is executed periodically (the frequency of execution is determined by each organization based on the presence of the new data) to make sure that the class structure is updated in-time in view of the availability of the new data. Two different organizations, such as the service organization and the quality-control organization, may have ontologies with the same set of data classes. However, an organization with a different focus may have an ontology 206 with a different set of data classes. For example, the ontology 206 for the manufacturing (e.g., wiring) organization has data class S1 for faulty source, data class SY for faulty symptom, and data class A for action taken, and the ontology 204 for the quality organization has a data class S1 for faulty part/component/module source, a data class SY for faulty symptom, a data class FM for failure mode, and a data class A for action taken.

These different ontologies 202, 204, 206 can be merged according to the method of the present technology into a new ontology for a new purpose. When merging these heterogeneous ontologies, some data classes can be included in the new ontology while other data classes may be omitted if these data classes are not consistent with the new purpose. For merging the two classes that are part of the exiting ontologies, the rules, which are learned from the data, determine which classes from the existing ontologies can be merged into a single class, e.g., symptom and failure mode can be merged into the class Symptom.

Similarly the rules are learned from the data and determine which phrases in the existing data can be tagged by using the existing classes included in the ontology. If the phrases in the data are not tagged by using the existing class structure, new classes can be developed and included in the ontology. Finally, the classes from the existing ontologies that are not required to tag the existing data and such classes are deleted from the class structure of the new ontology. For example, while analyzing the Vehicle Owner's Questionnaire collected at the NHTSA website, there is no requirement for the data class Action, because the Vehicle Owner's Questionnaire data does not have any mentioning of the corrective actions performed to fix the fault or failure, and therefore in the new ontology the data class Action from the existing ontology is removed.

With further reference to FIG. 2, block 208 illustrates an operation for merging different ontologies. The data class S1 for fault source for the ontology 202 (or, ontology A), the ontology 204 (or, B), and the ontology 206 (C) are merged into data class S1 of a new ontology 210 (or, D). Similarly the data class SY for symptom from the ontology 202 (A), the ontology 204 (B), and the ontology 206 (C) are merged into data class SY of the new ontology 210 (D). The action taken from the ontology 206 is kept for the new ontology 210 (D).

During the merging process, a data class in one existing ontology may be merged into a different data class in the new ontology. The existing ontologies are applied on the data that is under consideration and the phrases that have conflicting annotation due to the existing data class structure in the ontology. For example, in block 208, the phrase, 'internal leakage' in an existing ontology 202 (or, A) is an instance of the data class FM (failure mode), while in the new ontology it is an instance of the data class 'Symptom,' then the data class FM Failure Mode is merged into the single data class, say 'Symptom.' The decision on whether to merge a data class in one existing ontology into a different data class in a new ontology is based on the frequency of each class and its instances getting observed in the data. That is, if the phrases associated with the class Symptom have a higher frequency than the ones associated with the Failure Modes,' then the resulting merged class is referred to as the 'Symptom.'

For the phrases in the collected data that cannot be tagged by using the exiting data class structures, new classes are introduced and then such classes can be used to annotate the missing phrases. For example, in block 208, data classes AE, BI, BA, and LO are introduced. So, the new ontology 210 (D) includes the data structures S1, SY, AE, BI, BA, and LO.

Figure 3:
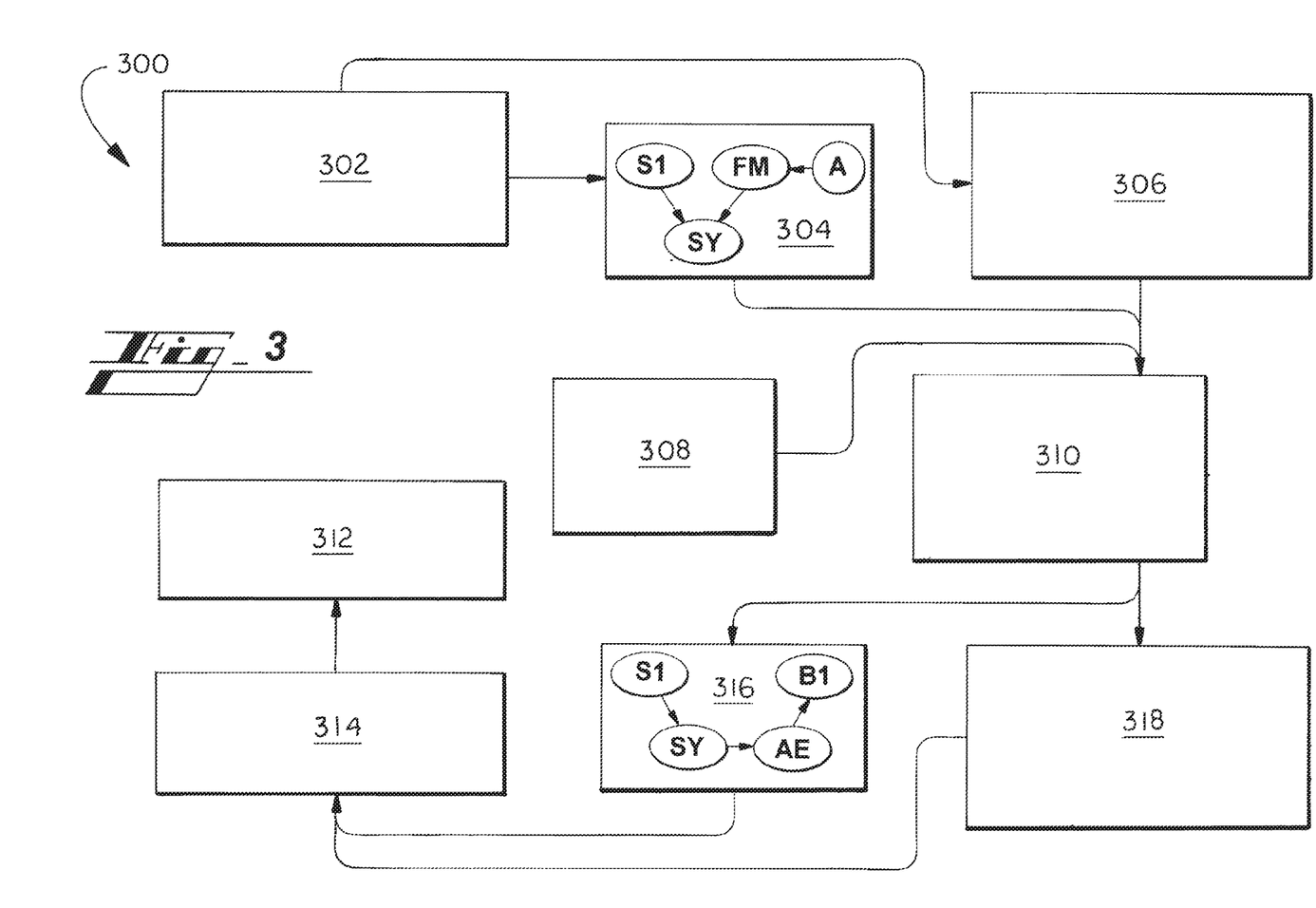
FIG. 3 is an example 300 of creating a new ontology.

FIG. 3 is an example 300 of creating a new ontology by merging an existing ontology with data newly collected. For a verbatim statement 302, "Cust states engine would not crank. Found dead battery. Replace battery," under the existing ontology (with "Cust" representing 'customer'), the words in the statement are classified into terms associated with different data classes 306: "engine" is in the data class fault part S1, "would not crank" is in the data class symptom SY, "dead battery" is in the data class failure mode FM, and "replace battery" is in the data class action A. Block 304 illustrates the relationship between the terms in the verbatim statement 302.

The existing ontology, represented by the blocks 302, 304, and 306, and the metadata 308 from the newly collected data are merged through a filtering and fusion process, block 310. A new set 318 of data classes is created after the filtering and fusion process 310 and a new relationship 316 can be derived for the terms according to these data classes. The new data class set 318 includes "engine" and "battery" in the data class fault part S1, and "would not crank," "dead," and "replace" in the data class symptom SY. In the new relationship 316, a fault signature is shown to include two elements, primary and secondary, wherein the primary is assigned to S1 and the secondary is assigned to SY. The new data classes 318 and the new relationship 316 can be applied to a verbatim statement 314, "I had a dead battery and my engine would not crank. I had to replace the batter." and will produce a set of customer observables 312, such as engine< >would not crank, battery< >dead, and battery< >replace.

The relationship between the data classes and the terms they are associated with is derived from the filtering and fusion process. The relationship between the data classes are learned from the data. The relationships between two classes show how two classes are related with each other in a given dataset. For examples, the relation Has_A exists between the two classes S1 and Sy, which means that in a given data, any part, component, module, or software included in a vehicle can have a faulty symptom. On the other hand, the relation Is_A exists between class Symptom and its two more specific subclasses, 'Text Symptom' and DTC Symptom,' further classifies the symptom. The class Text Symptom allows us to capture all the textual type of symptoms mentioned by the customer while using the vehicles, e.g., fail to start, loss of power etc. and the class DTC Symptom is used to capture the Diagnostic Trouble Codes (DTCs), i.e. the fault codes set in a vehicle in the event of malfunction during the on-board diagnostic tests run for the control systems testing their input/output. There are four types of Base DTC Codes: Pnnnn (P codes) associated with the faults related to the Powertrain, Bnnnn (B Codes) associated with the faults related to the Body systems, Cnnnn (C Codes) associated with the faults related to the Chassis systems, and finally Unnnn (U Codes) are associated with the faults related to the inter module communication, network, and controller. If the tests failed, the control module stores DTC with status (active or passive code).

When the vehicle is taken to the dealer, a technician can hook a scan tool to see whether any DTC codes are set in a vehicle. The method of the present technology allows clean separation of the classes into their appropriate subclasses, which are learned from the data, and helps to perform appropriate fault diagnosis and investigation about the control modules involved in the fault event. The rules are also developed to learn specific relations that are associated with each class based on the data. For example, the class DTC Symptom consists of the relation Has_Status_Byte' that can be populated to capture the associated Status Byte (ranging from 0-7) with each DTC. Such type of specific relations learned from the data helps technicians to further diagnose root-cause the fault correctly.

For example, if a user describes a symptom as part of an accident resulting in physical injury, the relationship would be illustrated as a Symptom is associated with an Accident Event, which results in Body Impact. If another user describes a symptom that caused a failure only, the relationship would be illustrated as a Symptom has a Failure Mode, which in turn can be fixed by performing a Corrective Action.

The method according to the present technology processes the verbatim statements from different sources and breaks the verbatim statements into shorter terms and each term associated with a baseword according to the ontology processing rules. One exemplary set of the ontology processing rules is shown in table 1. Taking the example of the verbatim statement 302 from FIG. 3, "dead battery" is a term and "battery" is a baseword. The baseword is then associate with a data class. The baseword "battery" would be associated with a data class Fault Part (S1). The relationships between the terms from the verbatim statements are recorded.

Figure 4:
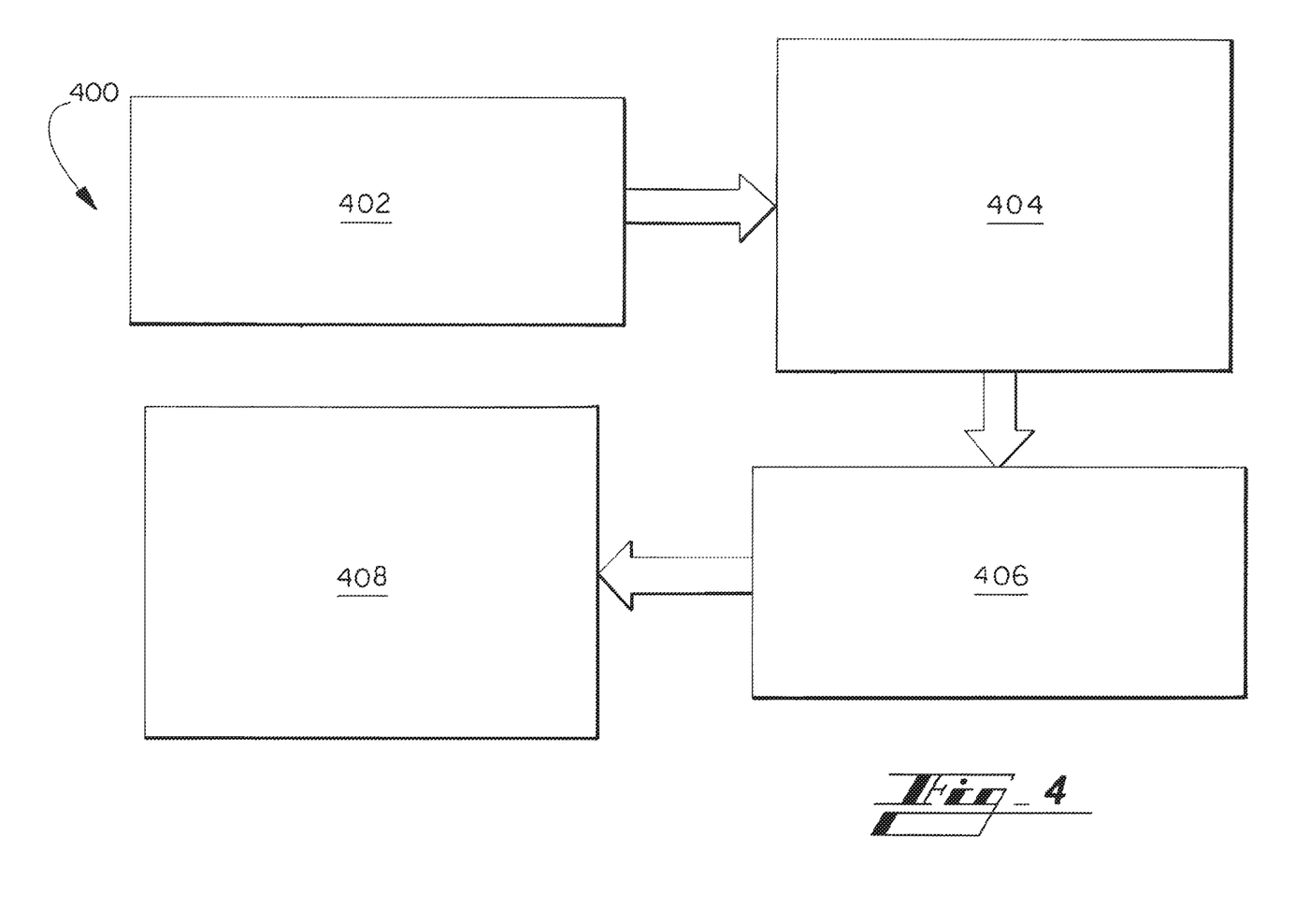
FIG. 4 illustrates an exemplary method 400 according to embodiments of the present technology.

FIG. 4 illustrates an exemplary process 400 according to one embodiment of the present technology. The process 400 starts with a pre-processing step, block 402, during which the verbatim statements are processed to remove extra spaces and punctuations and to correct misspellings. The terms containing "and" or "or" are also divided into separate terms. After the verbatim statements are separated into the terms, important information such as parts names, location information, foreign language terms, etc., are extracted, block 404. Each of these extracted terms may be associated with one or more basewords and a best baseword will be chosen and assigned to the term, block 406. For terms that may also have multiple interpretations such as a part or a symptom, the term is assigned to symptom. When there are synonymous basewords, they will be aggregated under one single baseword, block 408.

Typically, different stakeholders validate the ontology generated from different data sources and therefore there are variations in the way the basewords are assigned. However it is important to have a single and consistent baseword assigned in the final ontology to avoid having duplicated entries. To this end, the rules are developed which compares any two basewords in the ontology and the basewords with their similarity score above specific threshold are considered as the synonym. All such synonymous basewords are aggregated into a single baseword.

According to the process 400, the terms in the ontology are applied onto the data to identify the critical phrases such as parts, symptoms, failure modes, actions, etc, and based on what type of customer observables are needed to be constructed to do the analysis, such as (Part Symptom), (Symptom Symptom), (symptom Accident Event), etc. only those classes and their instances from the ontology are associated with the data.

The process 400 can further generate a pair of outputs, Primary term and Secondary term. The Primary term and Secondary term are determined according to the business requirements. The following are few exemplary scenarios for the selection of the Primary term and the Secondary term. Scenario 1: the Primary term can be a faulty part and the Secondary term can be an associated Symptom if the business wants to know which symptoms are associated with the faulty parts. Scenario 2: the Primary term can be a Symptom and the Secondary term can be another Symptom if the business wants to know when one Symptom is observed which other symptoms are associated with it. Scenario 3: the Primary term can be a Symptom and the Secondary term can be the Failure Mode, if the business would like to know when a specific Symptom is observed which Failure Modes are associated with the symptoms. Scenario 4: the Primary term can be Failure Mode and the Secondary term can be a corrective Action, if the business wants to know with a specific failure mode to which corrective actions are performed in the field.

Figure 5:
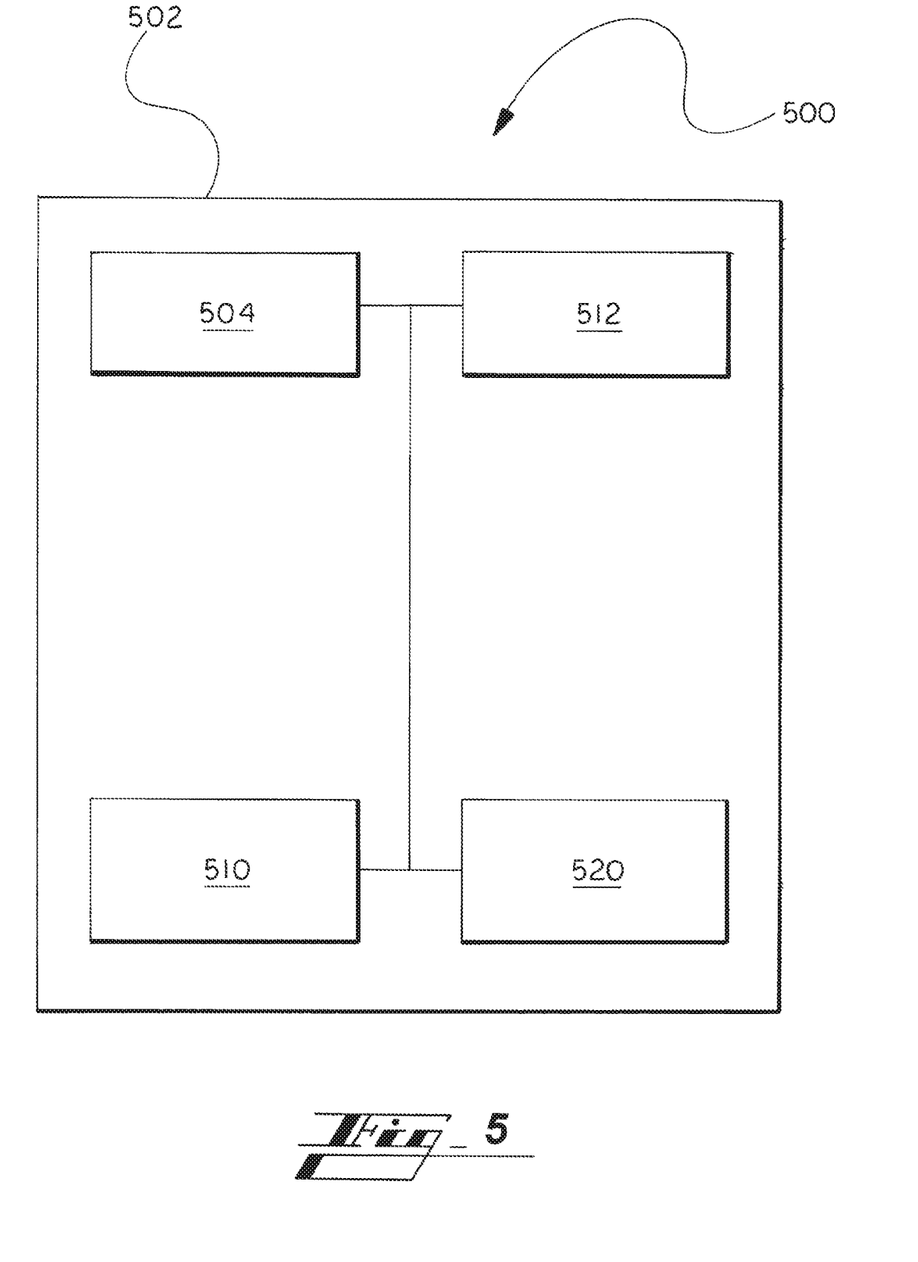
FIG. 5 is architecture 500 of an apparatus 502 according to one embodiment of the present technology.

FIG. 5 is architecture 500 of an apparatus 502 according to one embodiment of the present technology. The apparatus 502 comprises a network interface unit 504, a user interface unit 512, a tangible processing control unit 510, and a storage unit 820. The apparatus 502 may further comprises other functional units but for the purpose of the present description, only the above listed units are described. The network interface unit 504 communicates with other servers through a network and downloads the ontologies from different organizations. The user interface unit 512 enables users to enter or to amend rules for merging different ontologies. The storage unit 820 stores the downloaded ontologies, the rules for merging the ontologies, and a computer-readable codes that, when executed by the control unit 510, enables the apparatus to interface with different servers, to merge the downloaded ontologies, and to create a new ontology.

The computer-readable codes in the storage unit 520, when executed by the control unit 510, enables the apparatus 502 to behave as having the following units: (i) a first receiving unit that receives a plurality of ontologies, each ontology having a set of rules and a class structure with a plurality of data classes, (ii) a second receiving unit that receives data, (iii) a comparison unit that compares the data classes from the plurality of ontologies, (iv) a merging unit that merges the data classes that are identical or consistent into a new data class, (v) a discarding unit that discards the data classes that are inconsistent, a (vi) new-set-generation unit that generates a new set of class structure, (vii) a leaning unit that learns new rules based on the data received, and (viii) a determining unit that determines whether a new data class is needed, It should be understood that the steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A system, for filtering and fusing multi-source ontologies, comprising:
    a tangible processing control unit; and
    non-transitory computer-readable storage device in communication with the tangible processing control unit and having computer-readable code comprising:
        a first receiving unit that, when executed by the tangible processing control unit, receives a plurality of ontologies, each ontology having a set of rules and a class structure with a plurality of data classes, wherein each of the class structures defines a relationship between the plurality of data classes, and wherein the plurality of ontologies includes a first ontology and a second ontology that have different class structures;
        a second receiving unit that, when executed by the tangible processing control unit, receives data;
        a comparison unit that, when executed by the tangible processing control unit, compares the data classes from the plurality of ontologies;
        a merging unit that, when executed by the tangible processing control unit, merges a first data class of the plurality of classes of the first ontology with a first data class of the plurality of classes of the second ontology that are identical or consistent with one another into a new data class, wherein it is determined to merge the first data class of the first ontology into the first data class of the second ontology based on a comparison of a frequency of portions of the data that are tagged with the first data class of the first ontology and a frequency of portions of the data that are tagged with the first data class of the second ontology;
        a discarding unit that, when executed by the tangible processing control unit, discards data classes, of the plurality of data classes, that are inconsistent; and
        a new-set-generation unit that, when executed by the tangible processing control unit, generates a new set of class structure based on the new data class(es) and the class structures of the first ontology and the second ontology, wherein a textual portion of the data ("Textual Portion") is mapped to a data class ("DC") of the first ontology, the second ontology, and/or the new data class(es) based on the following equation:

$$P(\text{Textual Portion}_{DC} \mid Co-\text{occurring Term}_j) =$$
$$\operatorname{argmax}_{\text{Textual Portion}_{DC}} \frac{P(Co-\text{occurring Term}_j \mid \text{Textual Portion}_{DC}) P(\text{Textual Portion}_{DC})}{P(Co-\text{occurring Term}_j)}.$$

2. The system of claim 1, wherein the class structure of the first ontology includes a symptom class and the class structure of the second ontology includes a failure mode class.

3. The system of claim 2, wherein the merging unit, in merging the first data class of the first ontology with the first data class of the second ontology that are identical or consistent with one another into the new data class, merges the symptom class of the first ontology with the failure mode class of the second ontology.

4. The system of claim 1, further comprising a leaning unit that, when executed by the tangible processing control unit, learns new rules based on the data received.

5. The system of claim 1, further comprising a determining unit that, when executed by the tangible processing control unit, determines whether a new data class is needed.

6. The system of claim 1, further comprising a determining unit that, when executed by the tangible processing control unit, determines whether any existing data class from any of the plurality of ontologies is no longer needed.

7. The system of claim 6, wherein the discarding unit, in discarding the data classes that are inconsistent, discards the data class from any of the plurality of ontologies that is no longer needed.

8. The system of claim 1, wherein the merging unit, in merging the data classes that are identical or consistent into the new data class, merges two data classes when a phrase from the data has a conflicting annotation according to two data classes.

9. The system of claim 1, wherein the new-set-generation unit generates the new set of class structure when a phrase from the data is not annotated by the data classes of the plurality of ontologies.

10. The system of claim 1, further comprising a deletion module that, when executed by the processing control unit, deletes any data class of the plurality of ontologies when the data class is not used to annotate the data received.

11. A method, for filtering and fusing multi-source ontologies, comprising:

receiving, by a tangible processing unit executing a first receiving module of a non-transitory computer-readable storage device, a plurality of ontologies from a plurality of servers via a network interface unit communicatively coupled to the tangible processing unit and the plurality of servers, each ontology having a set of rules and a class structure with a plurality of data classes, wherein the plurality of ontologies includes a first ontology and a second ontology, wherein each of the class structures defines a relationship between the plurality of data classes, and wherein the set of rules for the first ontology are different than the set of rules of the second ontology;

receiving, by the tangible processing unit executing a second receiving module of the non-transitory computer-readable storage device, data;

comparing, by the tangible processing unit executing a comparison module of the non-transitory computer-readable storage device, the data classes from the plurality of ontologies;

merging, by the tangible processing unit executing a merging module of the non-transitory computer-readable storage device, data classes, of the plurality of data classes, that are the same or consistent into a new data class;

discarding, by the tangible processing unit executing a discarding module of the non-transitory computer-readable storage device, data classes, of the plurality of data classes, that are inconsistent; and generating, by the tangible processing unit executing a new-class-generation module of the non-transitory computer-readable storage device, a new set of class structure of a new ontology, wherein the new ontology includes a merged set of rules that are derived based on the set of rules of the first ontology and the set of rules of the second ontology, and wherein the merged set of rules of the new ontology are used to determine which classes are relevant for purposes of tagging portions of textual data, wherein a textual portion of the data is mapped to a data class of the first ontology, the second ontology, and/or the new data class(es) based on:

calculating both a first probability value representing a probability of the textual portion belonging to a first data class and a second probability value representing a probability of the textual portion belonging to a second data class, wherein the first probability value and the second probability value are calculated using a probabilistic classifier; and selecting the first data class to be the data class to which the textual portion is mapped when the first probability value is greater than the second probability value and selecting the second data class to be the data class to which the textual portion is mapped when the second probability value is greater than the first probability value.

12. The method of claim 11, wherein the class structure in the first ontology includes a symptom class and the class structure in the second ontology includes a failure mode class.

13. The method of claim 12, wherein the computer further performs merging the symptom class in the first ontology with the failure mode class in the second ontology.

14. The method of claim 11, further comprising learning new rules from the plurality of data.

15. The method of claim 11, further comprising determining, by a determining module, whether a new data class is needed, wherein generating the new data class is performed when determined needed.

16. The method of claim 1, further comprises determining whether any existing data class from any of the plurality of ontologies is no longer needed, and the discarding includes discarding the data class from any of the plurality of ontologies that is no longer needed.

17. The method of claim 11, wherein the merging comprises, when a phrase from the data has a conflicting annotation according to two data classes, merging the two data classes.

18. The method of claim 11, wherein the further computer further performs, when a phrase is not annotated by the data classes of the plurality of ontologies, creating a new data class.

19. The method of claim 11, further comprising deleting any data class, of the plurality of data classes, when the data class of the plurality of ontologies is not used to annotate the plurality of data.

20. A non-transitory computer-readable storage device, for filtering and fusing multi-source ontologies, comprising:

a first receiving module that, when executed by a tangible processing control unit in communication with the non-transitory computer-readable storage device, receives a plurality of ontologies, each ontology having a set of rules and a class structure with a plurality of data classes, wherein each of the class structures defines a relationship between the plurality of data classes, wherein the plurality of ontologies includes a first ontology and a second ontology that have different class structures, and wherein the set of rules for the first ontology are different than the set of rules of the second ontology;

a second receiving module that, when executed by the tangible processing control unit, receives data;

a comparison module that, when executed by the tangible processing control unit, compares the data classes from the plurality of ontologies;

a merging module that, when executed by the tangible processing control unit, merges a first data class of the plurality of classes of the first ontology with a first data class of the plurality of classes of the second ontology that are identical or consistent with one another into a new data class, wherein it is determined to merge the first data class of the first ontology into the first data class of the second ontology based on a comparison of a frequency of portions of the data that are tagged with the first data class of the first ontology and a frequency of portions of the data that are tagged with the first data class of the second ontology;

a discarding module that, when executed by the tangible processing control unit, discards data classes, of the plurality of data classes, that are inconsistent; and a new-set-generation module that, when executed by the tangible processing control unit, generates a new set of class structure of a new ontology based on the new data class(es) and the class structures of the first ontology and the second ontology, wherein the new ontology includes a merged set of rules that are derived based on the set of rules of the first ontology and the set of rules of the second ontology, and wherein the merged set of rules of the new ontology are used to determine which classes are relevant for purposes of tagging portions of textual data, wherein a textual portion of the data ("Textual Portion") is mapped to a data class ("DC") of the first ontology, the second ontology, and/or the new data class(es) based on the following equation:

$$P(\text{Textual Portion}_{DC} \mid Co-\text{occurring Term}_j) = \\ \text{argmax}_{\text{Textual Portion}_{DC}} \frac{P(Co-\text{occurring Term}_j \mid \text{Textual Portion}_{DC})P(\text{Textual Portion}_{DC})}{P(Co-\text{occurring Term}_j)}.$$

* * * * *